United States Patent [19]

Hazenbroek

[11] Patent Number: 5,035,673
[45] Date of Patent: Jul. 30, 1991

[54] ON-LINE BREAST HALVER

[76] Inventor: Jacobus R. Hazenbroek, Burg de Zeeuwstraat 52, Numansdorp, Netherlands

[21] Appl. No.: 472,719

[22] Filed: Jan. 31, 1990

Related U.S. Application Data

[63] Continuation-in-part of Ser. No. 472,891, Jan. 31, 1990.

[51] Int. Cl.$^5$ .............................................. A22C 21/00
[52] U.S. Cl. .................................. 452/149; 452/151; 452/155; 452/167
[58] Field of Search ............... 17/11, 52, 45; 452/149, 452/151, 155, 165, 167

[56] References Cited

U.S. PATENT DOCUMENTS

| | | | |
|---|---|---|---|
| 4,270,243 | 6/1981 | Lewis | 17/11 |
| 4,439,891 | 4/1984 | Van Mill | 17/11 |
| 4,815,168 | 3/1989 | Van Der Nieuwelaar et al. | 17/11 |

FOREIGN PATENT DOCUMENTS 2129278  5/1984  United Kingdom ..................... 17/11

Primary Examiner—Willis Little
Attorney, Agent, or Firm—Thomas, Kerr & Kayden

[57] ABSTRACT

The present invention comprises a method and apparatus for automatically halving and processing the breasts and backs of poultry carcasses while the carcasses are still moving along a poultry processing line. The carcasses are pulled along the length of an internal guide rail (29) for processing. A rotary halving blade (48) positioned initially below the internal guide rail (29) is movable upwardly to engage and cut the breast into halves. After the breast has been split in half by the rotary halving blade (42), a pair of rotary separator blades (48) cut through the back of the carcass between the breast and thighs of the carcass to separate the breast and upper back from the legs, thighs and lower back of the carcass. A pair of back removal blades (61) positioned above the internal guide rail (29), the rotary separator blades (48) removes the upper backbone from the breast.

21 Claims, 3 Drawing Sheets

ON-LINE BREAST HALVER

CROSS-REFERENCE

This is a continuation-in-part of U.S. Pat. Application Ser. No. 07/472,891, filed Jan. 31, 1990.

FIELD OF THE INVENTION

The present invention relates in general to poultry processing. More particularly, the invention relates to a method and apparatus for automatically separating the breast and upper back, known as the upper carcass portion, from the lower back, thighs and legs, known as the saddle or lower carcass portion, of poultry carcasses of previously eviscerated birds as the birds are suspended by their legs and moved in series along an overhead conveyor system.

BACKGROUND OF THE INVENTION

In the processing of birds through a poultry processing plant for defeathering, evisceration, cut-up and for packaging and delivery to the retail grocery store, etc., it is highly desirable to perform as many as is practicable of the processing steps with automated machinery and with a minimum of manual labor so as to minimize the expense of the process and to uniformly cut apart the birds.

In recent years, the birds have been carried along a processing line suspended by their legs from an overhead conveying system with as many of the processing steps as practical being performed on the birds as they move in series on the overhead conveying system. For example, the birds can be defeathered, decapitated, opened, and eviscerated as the birds are advanced progressively along a poultry processing line. It is further desired that the birds be segmented while continuing their travel on the overhead conveying system, thus reducing the number of times the birds must be handled manually. However, it is still a common practice to remove the poultry carcasses from the overhead conveying system in order to cut the birds into sections.

Recently, some equipment has been developed to form preliminary cuts in poultry carcasses while the carcasses remain suspended by their legs from an overhead conveyor system. For example, U.S. Pat. No. 4,547,429 discloses a method and apparatus of halving poultry carcasses whereby the birds remain suspended by their legs while moving along an overhead conveyor system as the birds are cut between the breast or upper carcass portion and the saddle or lower carcass portion of the bird. However, the breast portion of the bird is then generally permitted to fall uncontrolled into a receptacle or onto a conveyor for further manual handling.

It can therefore be seen that it is desirable to provide a method and apparatus which performs the functions of separating previously eviscerated poultry carcasses as the carcasses are moved in series along an overhead conveyor system, and as the carcasses are separated, the pieces thereby removed from the overhead conveyor system are received by and automatically processed by the equipment so as to avoid further manual handling of the carcass parts.

SUMMARY OF THE INVENTION

Briefly described, the present invention comprises an on-line breast halving method and apparatus for automatically separating the breast and upper back or upper carcass portion from the saddle or lower carcass portion of poultry carcasses as the birds are moved in suspended series along an overhead conveyor system. The breast halving apparatus is positioned along a poultry processing line and can be raised and lowered into correct position for receiving the poultry carcasses carried by the conveyor system. Preferably, prior to moving into engagement with the breast halving apparatus, the carcasses will have been passed on the overhead conveyor system through a previous cutting station, similar to the apparatus described in U.S. Pat. No. 4,574,429. At this previous cutting station, the skin and tissue joining the tail to the breast and extending at the sides of the visceral cavity of each bird will have been initially cut to partially separate the saddle from the breast.

As the whole poultry carcasses move in series along the processing line suspended by their legs with their breasts facing forward, the breast of each carcass comes into contact with the upwardly sloping portions of a pair of parallel guide rods. The contact of the breast with the guide rods urges the breast to tilt rearwardly from its vertically suspended position hanging from the overhead conveyor. The tilting of the breast results in the visceral cavity becoming aligned with an elongated V-shaped internal guide rail. The visceral cavity of each bird is pulled onto the internal guide rail with the internal guide rail extending into the visceral opening of the bird and ultimately protruding out of the neck opening of the bird. The breast hangs below the internal guide rail as the back of the carcass rides on top of the internal guide rail. After the carcass has moved onto the internal guide rail, a pair of spring biased positioning straps engage opposite sides of the breast and press inwardly against the sides of the carcass, forcing the breast into tighter contact with the internal guide rail to center the keel portion of the breast for cutting by a rotary halving blade.

A rotary halving blade is mounted beneath the internal guide rail and is aligned between the positioning straps. The halving blade is movable from a lowered non-operative position upwardly into a raised operative position. In its lowered position, the halving blade is kept out engagement with the breast which consequently passes through the apparatus without being halved. In its raised cutting position the, halving blade is positioned in the path of the breast and engages the breast of the carcass, cutting into the breast along the keel of the breast to split the breast in half.

As the breast is moving along the internal guide rail, the backbone of the carcass between the breast and the saddle is pulled between the opposing guide edges of a pair of horizontally extending parallel positioning plates. The guide edges of the positioning plates form a Y-shaped slot between the plates through which the backbone of the carcass passes with the breast and upper back of the carcass passing below the positioning plates and the legs, thighs and lower back of the carcass passing above the positioning plates. The thighs of the carcass engage and become supported on the upper surfaces of the positioning plates. As each carcass is pulled along the processing path by the overhead conveyor, the contact of the thighs with the upper surfaces of the positioning plates further tilts and lifts the carcass to an elevation where the portion of the backbone to be severed is aligned within the Y-shaped slot. This also functions to cause the visceral cavity of the bird to become aligned with and to ride onto the internal guide rail.

A pair of rotary separator blades are mounted at the narrow end of the Y-shaped slot formed between the positioning plates and the blades are substantially aligned with the positioning plates. As the backbone of the carcass is moved through the Y-shaped slot, the separator blades engage the backbone between the thighs and the breast. The upper carcass is thus separated from the saddle, leaving the saddle to be carried along the overhead conveyor for later processing while completely removing the breast and upper back of the carcass from the processing line.

Upon being separated from the saddle by the separator blades, the breast and upper back are engaged by a pair of conveyors mounted on opposite sides of the internal guide rail which pull the breast forwardly along the length of the internal guide rail. A pair of rotary back removal blades are positioned parallel to and above the internal guide rail behind the rotary separator blades. The back removal blades are movable between a raised nonoperative cutting position out of the path of the upper back and backbone of the carcass and to a lowered operative cutting position in the path of the upper back of the carcass. In this lowered operative cutting position, the back removal blades straddle the backbone of the upper carcass and remove the backbone from the upper carcass as the upper carcass moves through the blades.

Upon the completion of the cutting operations to be performed by the apparatus, the breast and upper back portions are pulled by the conveyors along the internal guide rail to the discharge end of the internal guide rail where the divided breast and back are released from engagement with the chain conveyors. The internal guide rail slopes downwardly at its discharge end to urge the separated portions of the divided breast and backbone out of the apparatus into a receiving bin or onto a conveyor.

Therefore, it is an object of this invention to provide a method and apparatus for automatically separating the breast or upper carcass portion from the saddle or lower carcass portion of a poultry carcass while the carcasses are transported in series along a poultry processing line, and subdividing the breast into halves.

Another object of this invention is to provide a method and apparatus for automatically and reliably separating the breast and upper back portions from the saddle portion of a poultry carcass moving along an overhead conveying system with the saddle portion continuing with the overhead conveyor system, and dividing the breast into halves and removing the backbone from the breast.

Another object of this invention is to provide an improved method and apparatus for reducing the manual handling steps required in the process of dividing the breasts of poultry in a poultry processing plant.

Other objects, features and advantages of the present invention will become apparent upon reading the following detailed description, when taken in conjunction with the accompanying drawings.

DETAILED DESCRIPTION

Figure 1:
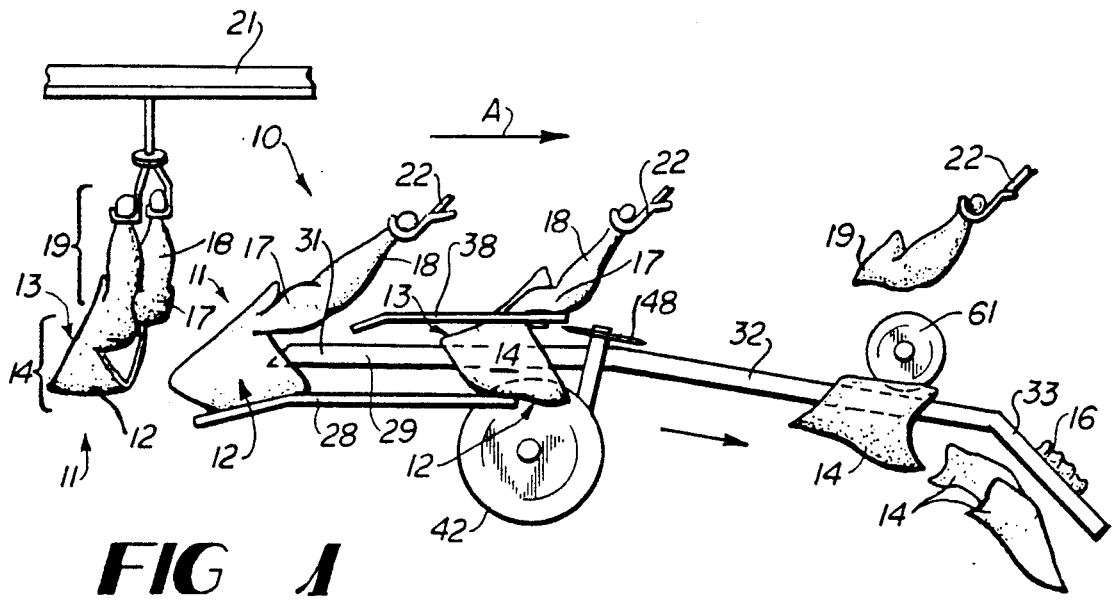
FIG. 1 is a schematic representation of the on-line breast halving apparatus and the process by which the breast is split in half separated from the saddle portion, and the backbone removed from the carcass.

Referring now in more detail to the drawings in which like numerals indicate like parts throughout the several views, FIG. 1 schematically illustrates the process utilized by the disclosed breast halving apparatus 10 wherein a series of whole, previously eviscerated carcasses 11 of poultry are processed. Each carcass 11 includes a breast 12 and upper back 13 which comprises the upper carcass portion 14, a backbone 16, and thigh 17 and leg 18 portions which comprise the lower carcass or saddle 19 of the carcass 11. The carcasses 11 hang by their legs 14 from an overhead conveyor system 21 with their legs secured by shackles 22 to the overhead conveyor system 21. The breast 12 faces downwardly and forwardly in the direction of movement of each of the carcasses 11 along a processing path, and the back portion 13 faces rearwardly. The wings of the carcass 11 typically will have been removed from the carcass 11 prior to its engagement by the breast halving apparatus 10.

Figures 2, 3:
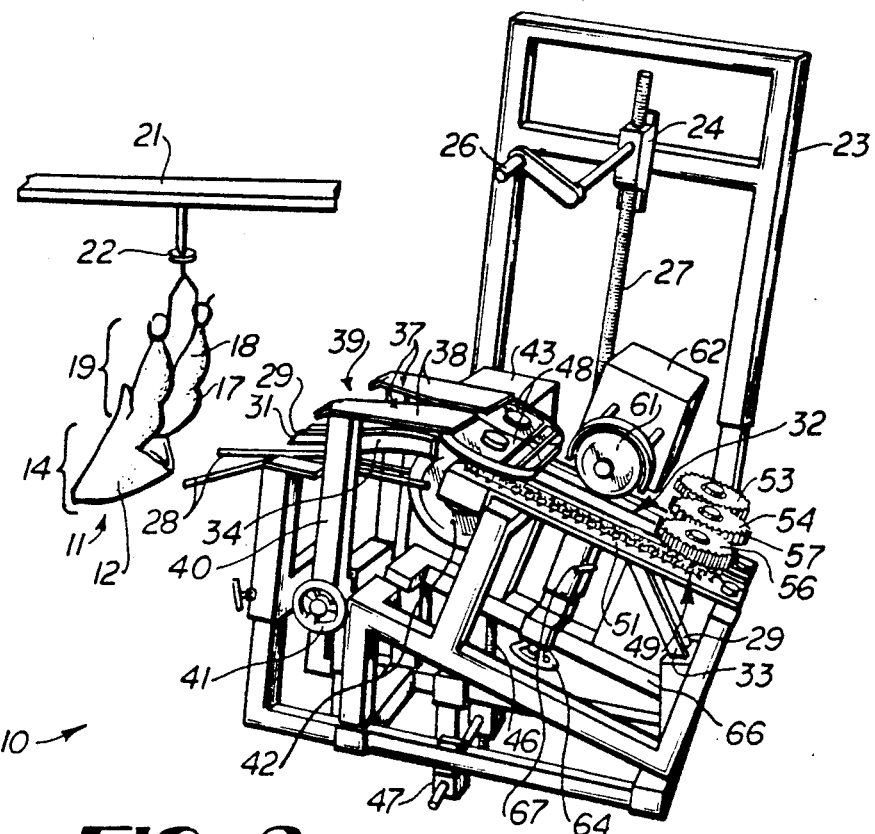
FIG. 2 is a perspective illustration of the breast halving apparatus embodying the principles of the present invention.
FIG. 3 is a plan view of the positioning plates, rotary separator blades and rotary back removal blades aligned above the internal guide rail with the conveyor chains on both sides of the internal guide rail.

The breast halving apparatus 10 is shown in greater detail in FIG. 2. In use, the breast halving apparatus 10 is hung from a building support in a poultry processing plant and aligned with an overhead conveyor system 21. The apparatus 10 is raised up and down into proper processing position in relation to the height of the carcasses 11 being carried along a poultry processing line with their legs 18 held in a shackle 22 on the conveyor system 21. The apparatus has an adjustable frame 23 and is raised and lowered with respect to the overhead conveyor system 21 by a hoist 24 which has a rotatable crank 26 attached thereto. As the crank 26 is turned, the hoist 24 engages the teeth along the length of an elongated hoist bar 27 to pull the entire apparatus frame 23 upward or to allow the apparatus frame 23 to be carefully lowered with respect to the height of the carcasses 11 being carried by the overhead conveyor 21. Thus, the entire apparatus 10 can be easily positioned to receive the carcasses 11 for processing.

At the foremost or entrance end of the apparatus 10, facing the direction of movement of the carcass, are a pair of parallel guide rods 28. The guide rods 28 are initially sloped upwardly, converging towards each other. As the guide rods extend into the apparatus, they level off becoming horizontally aligned, parallel to the movement of the carcasses 11 along the overhead conveyor system 21. The guide rods extend forward to align the visceral opening of the carcass 11 with an elongated internal guide rail 29. The internal guide rail has a V-shaped configuration and initially extends horizontally, above the horizontally extending portion of the guide rods 28 and substantially parallel to the overhead conveyor system 21 at its front end portion 31. After the front end portion 31 of the internal guide rail 29 is a substantially flat mid-portion 32 which slopes downwardly at approximately a twenty degree angle. At the rear of the apparatus 10 is the discharge portion 33 of the internal guide rail 29 which slopes downwardly at a much steeper angle of approximately seventy degrees.

Figure 4:
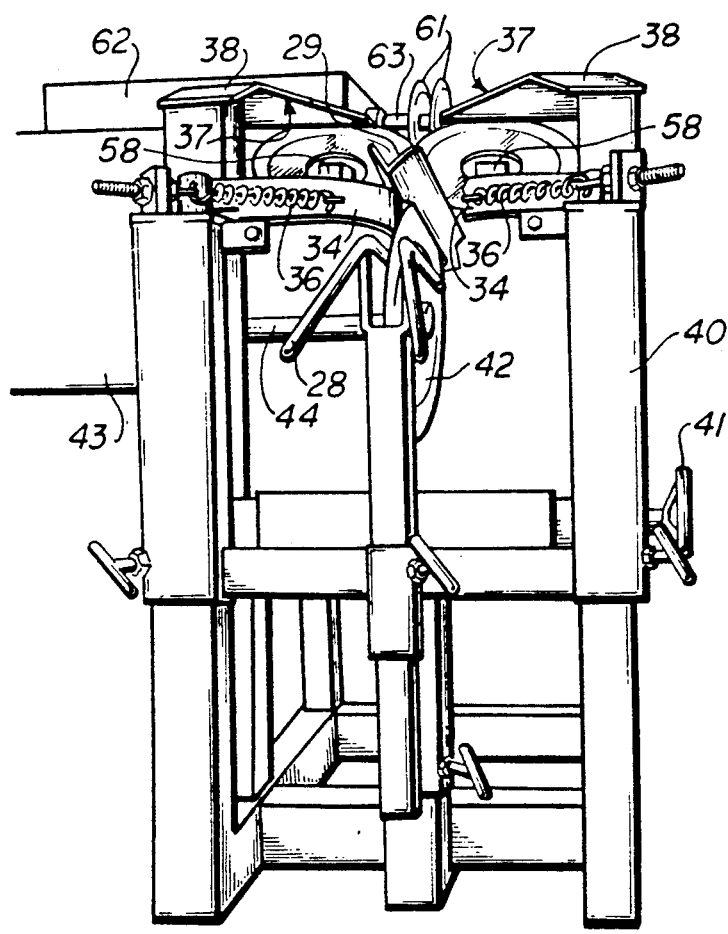
FIG. 4 is an end view of the internal guide rail at the front end portion of the apparatus below the movable guide plates.

Straddling the front end portion 31 of the internal guide rail 29 are a pair of spring biased positioning straps 34. As shown in FIGS. 3 and 4, the positioning straps 34 are mounted on opposite sides of the internal guide rail 29 and are initially spread apart and away from the internal guide rail 29. The positioning straps curve inwardly from their spread apart position toward the internal guide rail 29. Each of the positioning straps 34 is held adjacent the lower edge of the internal guide rail 29 by a tension spring 36. The tension springs 36 attach at one end to a separate positioning strap 34 and at their opposite end to the apparatus frame 23 and tend to pull the positioning straps 34 toward the internal guide rail 29.

As shown in FIG. 3, a pair of horizontally aligned positioning plates 38 are mounted to the apparatus frame 23 above the front end portion 31 of the internal guide rial 29. The positioning plates 38 extend parallel to the front end portion 31 of the internal guide rail and parallel to the direction of movement of the carcasses 11 (FIG. 2) carried by the overhead conveyor system 21. The inwardly facing surfaces of the positioning plates 38 form guide edges 37 which are spaced apart, forming a Y-shaped guide slot 39 therebetween. The Y-shaped guide slot 39 extends horizontally approximately parallel to the direction of movement of the carcasses 11 on the overhead conveyor system 21. The Y-shaped guide slot 39 can be made wider or narrower, to accommodate different sized carcasses 11, by the turning of an adjustment screw 41 located below the positioning plates 38 along the length of a positioning plate support bar 40.

As illustrated in FIGS. 2 and 4, a rotary halving blade 42 is extending partially through the front end portion 31 of the internal guide rail 29. The halving blade 42 is positioned below the internal guide rail 29 approximately parallel to the Y-shaped guide slot 39 and is partially between the positioning straps 34. The halving blade 42 is connected to a motor 43 by a drive shaft 44. The motor 43 drives the halving blade 42 and is positioned slightly beneath the edge of the positioning plates 38 on one side of the apparatus 10 (FIG. 2) The halving blade 42 and its drive motor 43 are raised and lowered into cutting position by a travel screw 46 which extends vertically, adjacent the apparatus frame 23. A rotatable crank 47 connects to the travel screw 46 and extends underneath the apparatus to the opposite side of the apparatus frame 23. The rotation of this crank 47 turns the travel screw 46 to thus control the raising and lowering of the halving blade 42 in and out of the operative cutting position. In its raised operative cutting position (FIG. 1), the rotary halving blade 42 engages the breast 12, cutting along the keel of the breast 12 to split the breast 12 in half. In its lowered, non-operative cutting position, the rotary halving blade 42 is kept out of engagement with the breast 12, leaving the breast 12 uncut.

As shown in FIG. 2, a pair of rotary separator blades 48 are positioned immediately behind the rotary halving blade 42 above the transition point between the front end portion 32 and the mid-portion 32 of the internal guide rail whereupon the internal guide rail 29 begins its downward slant of approximately twenty degrees. The separator blades 48 engage the carcass 11 and separate the upper carcass 14 from the saddle 19. The separator blades 48 are slanted downwardly at approximately a twenty degree angle, parallel to the slope of the mid-portion 32 of the internal guide rail 29. Thus as the upper carcass 14 is separated from the saddle 19 of the bird, the two sections are carried along diverging paths out of interference with one another, preventing the saddle 19 from being further engaged by the apparatus 10.

A pair of chain conveyors 49 (FIG. 3) are positioned on opposite sides of the internal guide 29 and have a plurality of teeth 51 along their length. The chain conveyors 49 are rotated along the length of mid-portion 32 of the internal guide rail 29 by a drive motor 52 mounted on the apparatus frame 23 (FIG. 2) at the rear of the apparatus adjacent the discharge end 33 of the internal guide rail 29. The motor 52 controls the rotation of a series of the three gear wheels 53, 54 and 56 which in turn cause the revolution of the chain conveyors 49 along the length of internal guide rail 29. The gear wheels 53, 54 and 56 are mounted above the discharge end 33 of the internal guide rail 29 at the rear of the apparatus and are arranged parallel to each other in a line extending laterally across the rear of the apparatus. Each of the gear wheels 53, 54 and 56 has a plurality of gear teeth 57 arranged about its circumference. The drive motor 52 rotates the first gear wheel 53 clockwise and as gear wheel 53 rotates, its gear teeth 57 engage the gear teeth 57 of the second gear wheel 54 causing gear wheel 54 to rotate in a counter-clockwise direction. The gear teeth 57 of the second gear wheel 54 engage the gear teeth 57 of the third gear wheel 56 positioned on the opposite side of gear wheel 54 from the first gear wheel 53, causing gear wheel 56 to rotate in a clockwise direction. The rotation of gear wheels 54 and 56 causes the chain conveyors 49 to travel along the mid portion 32 of the internal guide rail 29 in the direction of arrow B.

A pair of drive shafts 58 (FIGS. 4 and 5) positioned adjacent the positioning plates 38 between the foremost portion 31 and the mid-portion 32 of the internal guide rail 29 are rotated as the chain conveyors 49 rotate. The drive shafts 58 are connected at their upper ends to the rotary separator blades 48. The chain conveyors 49 are extended around the drive shafts 58 and as the chain conveyors 49 revolve, the drive shafts 58 are rotated. The rotation of the drive shafts 58 by the movement of the chain conveyors 49 in turn causes the separator blades 48 to rotate as well. Therefore, the same motor 52 (FIG. 2) which drives the chain conveyors 49 can be used to drive the separator blades 48 thereby saving energy and space as the one motor 52 performs both of these functions. As shown in FIGS. 2 and 3 a pair of back removal blades 61 are positioned above and approximately parallel to the mid-portion 32 of the internal guide rail 29 behind the separator blades 48. The back removal blades 61 are driven by a motor 62 connected to the blades 61 by a drive shaft 63.

The back removal blades 61 are lowered into a cutting position in the path of movement of the upper back 13 and backbone 16 of the carcass 11 to engage the upper back 13 and remove the backbone 16 from the upper back 13 or raised to a non-operative position out of engagement with the upper back 13 by an adjustment screw 64 positioned at the bottom of the support bar 66 which supports the motor 62. A set screw 67 affixed to support bar 66 is tightened to hold the support bar in place, thereby locking the back removal blades 61 in place at the selected height for processing. Thus, the back removal blades 61 can be positioned at varied processing heights above the upper back 13 and backbone 16 of a carcass 11, in an operative cutting position engaging the upper back 13 or a nonoperative position out of engagement with the upper back 13, to accommodate carcasses of differing sizes. In their lowered, operative cutting position, the back removal blades 61 engage the upper back 13 on both sides of the backbone 16, cutting through the meat of the upper back 13 (FIG. 1) to cut the backbone 16 out of the upper back 13.

Alternatively, a single back removal blade 61 may be used in place of the pair of blades 61 (FIG. 3). One back removal blade 61 is removed from the drive shaft 63 while the other is aligned above the centerline of the internal guide rail 29 above the center of the backbone 16 in the path of the backbone 16 and upper back 13. The back removal blade 61 is positioned above the center of the internal guide rail 29 by the placement of an additional spacer or washer 68 on drive shaft 63. The back removal blade 61 cuts through the backbone 16 to split the backbone in half and simultaneously separate the upper back 13.

In the operation of the breast halving apparatus 10, the carcass 11 (FIG. 1) will have been initially passed through a pre-cutter (not shown) of a type generally disclosed in U.S. Pat. No. 4,574,429, where an initial incision is made in the skin and tissue of the carcass 11 between the breast 12 and the thighs 17 along the top of the visceral cavity of the carcass 11. The initial incision causes the breast 12 to hang further from the saddle 19 so as to enlarge the opening between the breast 12 and the saddle 19. An accurate separation of the upper carcass 14 from the saddle 19 is thus possible, no matter what size carcass 11 is being processed.

After passing through the pre-cutter (not shown), the carcass 11 is carried along suspended from the overhead conveyor system 21 toward the breast halving apparatus 10. The breast 12 of the carcass 11 contacts the upwardly sloping portions of a pair of parallel guide rods 28 as the carcass 11 is carried into the breast halving apparatus 10. The contact of the breast 12 with the guide rods 28 causes the breast 12 to tilt rearwardly as the carcass 11 slides upwardly and forwardly along the guide rods 28. As a result of the breast 12 being tilted rearwardly, the visceral cavity extending through the center of the carcass 11 is tilted forwardly so that the visceral opening of the carcass 11 becomes aligned with the front end portion 31 of the elongated internal guide rail 29.

The carcass 11 is pulled onto the front end portion 31 of the internal guide rail 29 as the carcass 11 is carried forward by the overhead conveyor system 21. The visceral cavity surrounds the internal guide rail 29 with the internal guide rail 29 extending into the visceral opening, through the visceral cavity and out the neck opening of the carcass 22. The upper carcass 14 is supported by the internal guide rail 29, with the upper back or top of the internal guide rail 29, and the backbone 16 riding in the V-shaped cavity of the front end portion 31 of the internal guide rail as the breast 12 hangs below the internal guide rail 29.

Figure 5:
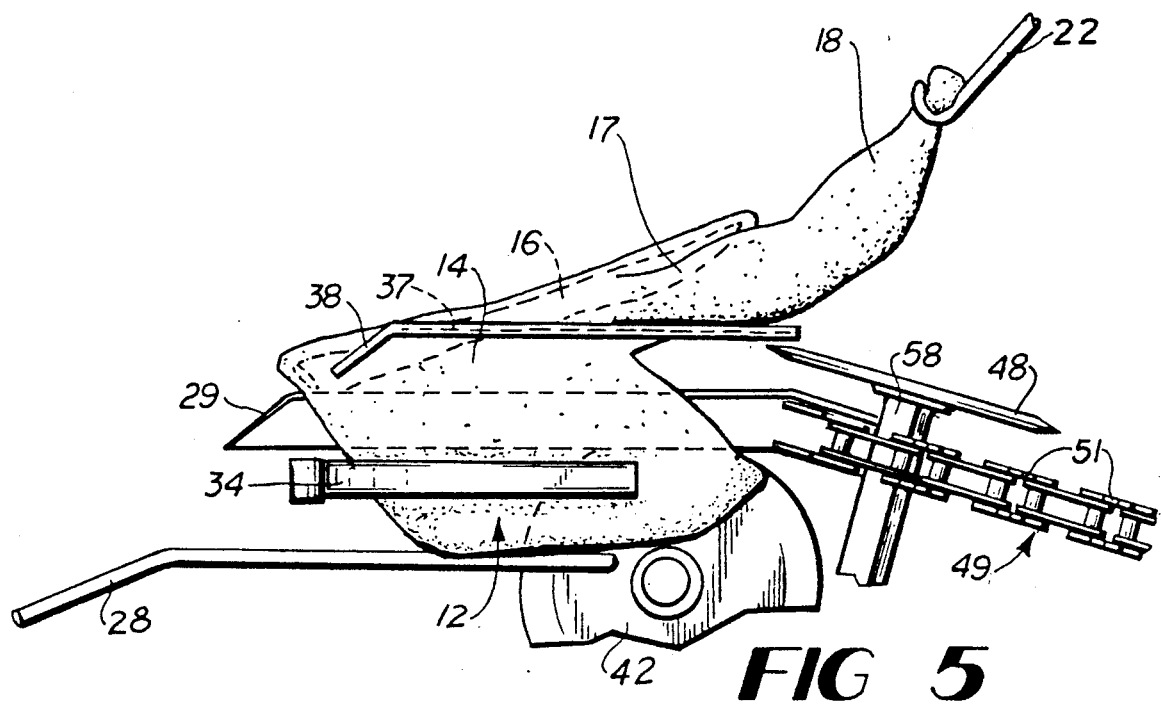
FIG. 5 is a side elevational view of the separation of the saddle portion of the poultry carcass from the breast and back portions of the carcass by the rotary separator blades immediately following the halving of the breast by the rotary halving blade.

The continued movement of the overhead conveyor system 21 pulls the upper carcass 14 along the internal guide rail. As the upper carcass 14 moves forward, the sides of the upper carcass 14 between the breast 12 and the upper back 13 are engaged by the pair of spring biased positioning straps 34, as shown in FIG. 5. FIG. 5 illustrates the contact of the positioning plates 34 with the sides of the upper carcass 14. As the positioning straps 34 engage the sides of the upper carcass 14, they press the sides of the upper carcass 14 inwardly. The keel of the breast 12 is thus centered along the bottom surface of the internal guide rail for a more accurate separation of the breast 12 into halves.

As the keel portion of the breast 12 is being centered under the internal guide rail 29, the carcass 11 is pulled further along the internal guide rail 29 in the direction of arrow A by the movement of the overhead conveyor system 21. The backbone 16 is passed between the opposed guide edges 37 of the pair of parallel positioning plates 38. The upper carcass 14 passes below the positioning plates 38 and the saddle 19 passes above the positioning plates 38 with the backbone 16 (FIG. 1) moving along the center of the Y-shaped slot 39 formed by the opposing guide edges 37. The guide edges 37 engage the backbone 16 and tend to contact the backbone at a notch or space between the vertebrae of the backbone 16 to isolate the notch for precise cutting of the backbone 16 as the upper carcass 14 is separated from the saddle 19. Additionally, the contact of the guide edges 37 with the backbone 16 holds the carcass 11 within the confines of the guide slot 39, preventing the carcass 11 from jumping or being pulled out of the apparatus 10 as the saddle 19 is separated from the upper carcass 14.

The thighs 17 slide along the upper surface of the positioning plates 38 (FIG. 5), further tilting the carcass 11 and supporting the carcass 11 at a desired elevation where the portion of the backbone 16 to be severed is aligned within the Y-shaped slot 39. The thighs 17 therefore function as a locator to support the upper carcass 14 and align the initial cut made by the pre-cutter (not shown) for a precise and accurate separation of the upper carcass 14 from the saddle 19. As the thighs slide along the upper surface of the positioning plates 38, the breast 12 is passed into engagement with the vertically oriented rotary halving blade 42 positioned immediately below the internal guide rail 29. The rotary halving blade 42 cuts through the breast 12, as the upper carcass 14 moves along the internal guide rial 29 with the positioning straps 34 pressing the sides of the upper carcass 14 inwardly to center the keel portion of the breast 12. The rotary halving blade 42 cuts through the keel of the breast 12 to be split into halves.

Following the severing of the breast 12 by the rotary halving blade 42, the carcass 11 proceeds into engagement with a pair of substantially horizontally oriented rotary separator blades 48. The separator blades 48 engage the carcass 11 at the guide incision created by the pre-cut machine. The guide incision is aligned with the separator blades 48 by the sliding contact of the thighs 17 on top of the positioning plates 38. The separator blades 48 cut through the meat between the breast 12 and thighs 17 and through the notch between the vertebrae of the backbone 16 which has been isolated by the guide edges 37 engaging the backbone 16 of the bird. The upper carcass 14 is thus separated from the saddle 19. As illustrated in FIG. 1, the separator blades 48 are slanted downwardly, parallel to the downwardly sloping mid-portion 32 of the internal guide rail 29 so that as the saddle 19 is separated from the upper carcass 14, it can be carried away by the overhead conveyor system 21 without being further engaged by the apparatus.

After the upper carcass 14 is separated from the saddle 19, it is pulled along the length of the internal guide rail 29 by the pair of chain conveyors 49 (FIG. 2) which engage the meat (FIG. 5) at the sides of the upper carcass 14 and pull the upper carcass 14 forwardly as the internal guide rail 29 begins to slope downwardly along its mid-portion 32. As the upper carcass 14 (FIG. 1) is pulled along the upper surface of the internal guide rail, the upper back portion is engaged by a pair of back removal blades 61 positioned above and parallel to the internal guide rail 29 after the rotary separator blades 48. The back removal blades 61 are lowered into engagement with the upper back 13, straddling the backbone 16 to cut the backbone 16 from the upper back 13 for removal separate from the breast 12 and upper back 13 of the carcass 11. Alternatively, a single back removal blade 61 may be used in place of a pair of blades to cut through the backbone 16 itself, causing the backbone 16 and upper back 13 to be split in half with the sections of the backbone 16 remaining with the halves of the upper carcass 14.

FIGS. 6A-8C schematically illustrate the engagement of a poultry carcass 11 by the rotary halving blade 42, the rotary separator blades 48, and the back removal blades 61 during the halving and processing operations.

Figure 6A:
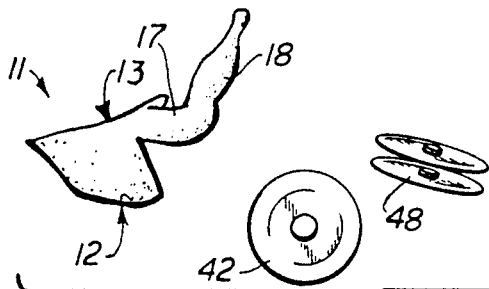
FIG. 6A, 7A and 8A are schematic side illustrations of the cutting blades, showing the positions of the cutting blades as the carcass moves into engagement with the blades.
Figure 6B:
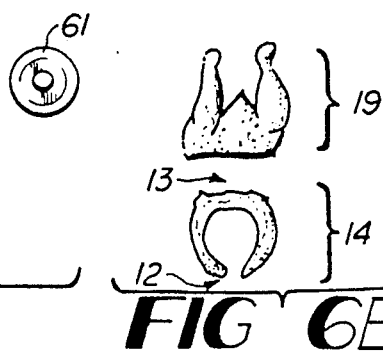
FIGS. 6B, 7B and 8B are schematic end illustrations of the upper carcass and saddle portion of the carcass showing the cuts made when the blades are positioned as shown in FIGS. 6A, 7A and 8A respectively.

FIG. 6A shows the carcass 11 proceeding toward the rotary halving blade which has been raised to its operative cutting position to engage and cut the breast 12 in half. The rotary separator blades 48 are shown positioned immediately adjacent the rotary halving blade to cut the saddle 19 away from the upper carcass 14 as the carcass 11 proceeds past the rotary halving blade 42. The back removal blades 61 are left in their raised non-operative position out of engagement with the upper back 13 and backbone 16. As the carcass 11 proceeds along the processing path into engagement with the rotary halving blade 42 and rotary separator blades 48, the breast 12 (FIG. 6B) is halved and the saddle 18 separated from the upper carcass 14 while the upper back 13 remains uncut.

Figure 7A:
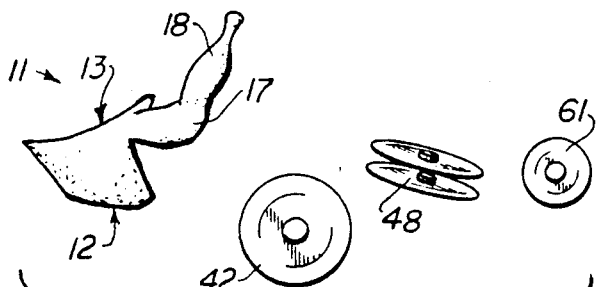
Figures 7B, 7C:
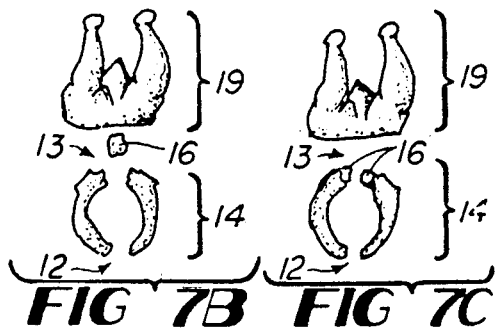
FIGS. 7C and 8C are schematic end illustrations of the upper carcasses and saddle portion of the carcass showing the cuts made when a single back removal blade is in use and positioned as shown in FIGS. 7A and 8A, respectively.

FIGS. 7A shows the back removal blades 61 lowered into their operative cutting position for engaging the upper back 13, and the rotary halving blade 42 raised to its operative cutting position to separate the breast 12 in half. The rotary halving blade 42 splits the breast (FIGS. 7B and 7C) after which the upper carcass 14 is separated from the saddle 19 by the rotary separator blades 48 (FIG. 7A). The back removal blades 61 in their lowered, operative cutting position engage the upper back 13 (FIG. 7B) on either side of the backbone 16 to cut the backbone out of the upper back 13 for removal. A single back removal blade 61 (FIG. 7A) may be used to engage the backbone 16 itself, cutting through the center of the backbone 16 to split the backbone 16 in half (FIG. 7C). Thus, the breast 12 and upper back 13 are separated into halves with the split sections of the backbone 16 remaining with the upper carcass 14 halves.

Figure 8A:
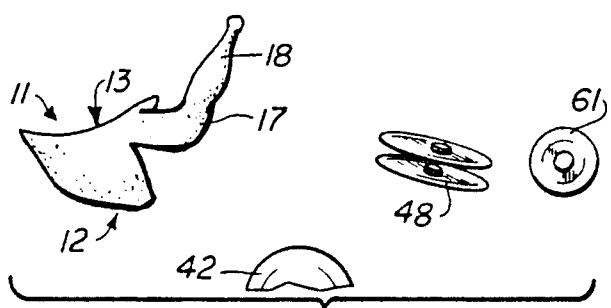
Figures 8B, 8C:
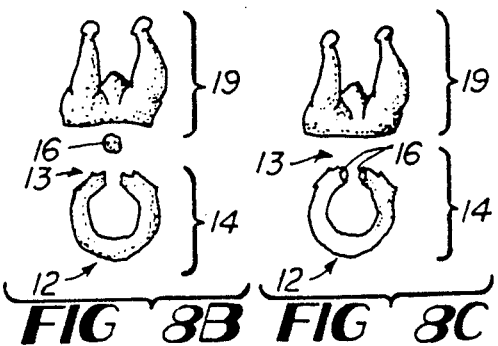

As illustrated in FIG. 8A, the rotary halving blade can be lowered to its inoperative resting position away from engagement with the breast 12 while the back removal blades 61 are left in their lowered, operative cutting position. The carcass 11 is passed into engagement with the rotary separator blades 61 which separate the saddle 18 (FIG. 8B and 8C) from the upper carcass 14. The back removal blades 61 (FIG. 8A) engage the upper back 13 (FIG. 8B) on either side of the backbone 16 to remove the backbone 16 from the upper back 13. Where a single back removal blade 61 (FIG. 8A) is in use, the upper carcass 14 is separated and the backbone 16 split in half, as shown in FIG. 8C, thus causing the upper back 14 to be split in half as well.

After the separation of a carcass 11 by the apparatus (FIG. 1) is completed, the cut-up carcass 11 is urged by the movement of the chain conveyors 49 toward the discharge end of the internal guide rail 29 where the separated sections fall away from the apparatus onto a collection conveyor (not shown). The discharge portion 33 of the internal guide rail 29 slants downwardly at a sharp angle away from the mid-portion 32 of the internal guide rail 29. When the breast 12 contacts the downwardly sloped front edge of the discharge end 33 of the internal guide rail 29, the breast 12 and upper back 13 sections are forced downwardly as they are released from engagement with the chain conveyors 49 ensuring the meat and skin between the sections of the breast 12 and upper back 13 are severed to completely separate the sections. If no breast cut has been made by the halving blade 42 (FIG. 8A, 8B and 8C), the downwardly slanted front edge of the internal guide rail 29 tends to urge the breast 12 (FIG. 1) downwardly and away from the internal guide rail 29 and the backbone 16, thereby completing separation of the backbone 16 from the upper back 16. Alternatively if a single back removal blade 61 is in use, the contact of the breast 12 with the internal guide rail 29 ensures that the sections of the breast 12 (FIGS. 9 and 8C) are guided apart, ensuring the skin on the breast 12 is severed to keep the breast sections separate.

The breast halving apparatus can accommodate any number of carcasses which might be carried by conventional processing lines. Consequently, it is seen that a method and apparatus is now provided for the on-line halving of the breast and back portions of poultry carcasses which allows a significant increase in the processing rate of these carcasses. The breast and back portions are automatically separated from the saddle of the carcass while the carcasses are carried by an overhead conveyor system, and are cut into sections without the necessity of removing the carcasses from the conveyor and manually transporting the carcasses to a separate processing machine.

While an embodiment of this invention has been described in detail, it should be understood that the described invention merely illustrates the presently preferred form of the invention and numerous variations or modifications may be made thereto without departing from the spirit and scope of the invention as set forth in the following claims.

I claim:

1. A method for the on-line processing of the breast and back portion of a poultry carcass or the like, comprising the steps of;

moving a plurality of previously eviscerated poultry carcasses in series along a processing path with the legs of the carcasses suspended from the processing line, the visceral opening of the carcasses facing upwardly and in the direction of movement of the carcasses and the neck openings facing downwardly, as each carcass moves along the processing line;

mounting the visceral cavity of the carcass on an internal guide rail with the back of the carcass riding on the internal guide rail, and as the carcass moves along the guide rail:

passing the carcass through a Y-shaped opening formed between a pair of parallel guide plates with the legs and thighs and lower back passing above the plates and the breast and upper back passing below the plates, supporting the thighs on the plates, splitting the breast into halves, cutting through the back of the carcass between the breast and thighs of the carcass to separate the legs and thighs and lower back from the breast and upper back of the carcass, and cutting along the backbone of the upper back of the carcass.

2. The method of claim 1 and further including the steps of tilting the breast and back of the carcass to position the visceral cavity of the carcass in a horizontal alignment with the internal guide rail.

3. The method of claim 1 wherein the step of dividing the breast comprises the steps of raising a rotary halving blade from a lowered non-operative position to a raised operative cutting position, cutting along the keel of the breast to halve the breast as the breast is urged along the internal guide rail before the breast and upper back are separated from the legs and thighs.

4. A method for the on-line processing of the breast and back portion of a poultry carcass or the like, comprising the steps of;

moving a plurality of previously eviscerated poultry carcasses in series along a processing path with the legs of the carcasses suspended from the processing line, the visceral openings of the carcasses facing upwardly and in the direction of movement of the carcasses and the neck openings facing downwardly, and as each carcass moves along the processing line:

mounting the visceral cavity of the carcass on an internal guide rail with the back of the carcass riding on the internal guide rail, urging the sides of the breast inwardly toward the internal guide rail for aligning the length of the keel portion of the breast beneath the length of the internal guide rail, and as the carcass moves along the internal guide rail, splitting the breast into halves, separating the legs and thighs and lower back from the breast and upper back of the carcass, and cutting along the backbone of the upper back of the carcass.

5. A method of on-line removal of the breast and upper back from the legs, thighs and lower back of a poultry carcass and separately processing the breast and upper back portions, comprising the steps of;

suspending each carcass by its legs from a shackle of an overhead conveyor;

moving each carcass hanging from its shackle with its breast leading its upper back toward a cutting station;

tilting the breast to align the visceral cavity so as to face the direction of movement;

trailing the thighs of each carcass along a guide surface so as to tilt the legs rearwardly from the overhead conveyor and partially support the carcass and its thighs, whereby the breast and its adjacent backbone are positioned at a predetermined elevation for proper separation from the saddle of the carcass;

mounting the visceral cavity about an internal guide rail;

cutting at the cutting station between the breast and thighs and through the backbone of the carcass to separate the legs, thighs and lower back from the breast and upper back of the carcass; and as the carcass passes along the length of the internal guide rail, selectively cutting longitudinally through the breast and upper back of the carcass.

6. The method of claim 5 and wherein the step of selectively cutting breast and upper back of the carcass comprises:

first cutting the breast along the keel of the breast to divide the breast; and subsequently cutting about the backbone to remove the backbone from the breast.

7. The method of claim 5 wherein the step of cutting longitudinally through the breast and upper back the carcass includes cutting through the keel of the breast and separating the breast into halves before the saddle of the carcass is separated from the breast and upper back of the carcass.

8. The method of claim 5 wherein the step of cutting longitudinally through the breast and upper back of the carcass includes the steps of cutting into the back on opposite sides of the backbone after the saddle has been separated from the breast and back of the carcass and removing the backbone from the back of the carcass.

9. The method of claim 5 wherein the step of cutting longitudinally through the breast and upper back of the carcass includes the steps of cutting longitudinally through the backbone of the carcass after the saddle has been separated from the breast and back of the carcass for splitting the backbone and separating the upper back of the carcass into halves.

10. An apparatus for the on-line halving of the breasts and backs and the removal of the backbones of partially eviscerated decapitated birds hanging by their legs and thighs, with their visceral openings facing upwardly and neck opening facing downwardly, from an overhead conveyor of a poultry processing line, comprising:

support means for positioning beneath the overhead conveyor of a poultry processing line, an elongated internal guide rail mounted on said support means for insertion in the visceral cavity of each bird as each bird is conveyed along the processing line and for supporting and aligning the breast and back of the birds during processing;

a vertical cutting means positioned below said internal guide rail for separating the breast of each bird into halves as each bird moves along said guide rail;

a pair of approximately horizontally extending support members located adjacent said internal guide rail for supporting the thighs of each bird and maintaining the birds at a predetermined height as the birds move along the processing line; and a horizontal cutting means positioned adjacent one end of said support members for cutting into the birds between the breast and thighs and through the backbone of the birds to separate the legs and thighs and lower back from the breast and upper back of the birds.

11. The apparatus of claim 10 and further including a pair of curved positioning straps mounted on either side of said internal guide rail for contacting the breast of the bird as it moves onto said internal guide rail, and a pair of springs each affixed at one end to said support means and to a positioning strap at its opposite end for urging each of said positioning straps inwardly toward contact with the breast of the bird on the internal guide rail thereby aligning the breast along the center of said internal guide rail for engagement by said halving blade.

12. The apparatus of claim 10 wherein said internal guide rail comprises a V-shaped elongated member having a horizontal input end for receiving the birds with the back above and the breast below said elongated member, and a discharge end for the removal of the processed sections of the birds.

13. The apparatus of claim 10 wherein said support members comprise a pair of parallel positioning plates each of said positioning plates having a guide edge which faces the guide edge of said other positioning plate forming a Y-shaped guide slot therebetween through which the birds pass with the thighs of the bird supported on top of said positioning plates with the backbone of the bird moving along said Y-shaped slot between said guide edges as the breast and back of the bird trail the thighs below said positioning plates.

14. The apparatus of claim 10 and further including a pair of parallel guide members mounted to said apparatus frame in front of said internal guide rail, sloping upwardly toward said internal guide rail to tilt the breast of the carcass rearwardly and the visceral opening of the carcass forwardly to thus align the visceral opening of the carcass with said internal guide rail.

15. An apparatus for the on-line halving and processing of the breast and back of poultry carcasses suspended by their leg and thigh portions from a processing line and moving with the processing line, comprising:

an internal guide rail for receiving and supporting the visceral cavity of each carcass with the upper back on top and the breast hanging below said internal guide rail as the carcass moves with processing line;

a pair of support members located above said internal guide rail for supporting and aligning the legs, thighs and lower back of each carcass at a predetermined height for separation from the breast and upper back of the carcass, breast cutting means mounted below said internal guide rail in the path of the breast as each carcass moves along said internal guide rail for cutting the breast into sections, separator means positioned above said internal guide rail for cutting through the back of each carcass between the breast and thighs of the carcass to separate the legs and thighs from the breast and upper back of the carcass, and a back cutting means positioned above said internal guide rail behind said separator means for cutting along the upper backbone from the carcass.

16. The apparatus of claim 15 wherein said back cutting means comprises a pair of rotary back removal blades longitudinally aligned above said internal guide rail and movable downwardly from a raised non-operative position to a lowered operative cutting position for engaging the back of the carcass on opposite sides of the backbone to remove the backbone from the bird.

17. The apparatus of claim 15 wherein said back cutting means comprises a rotary back removal blade aligned above the backbone of a carcass moving along said internal guide rail and movable downwardly from a raised non-operative position to a lowered operative cutting position, for cutting through the backbone to split the backbone in half.

18. The apparatus of claim 15 and further comprising conveyor means for urging the breast and upper back of each carcass along said internal guide rail.

19. The apparatus of claim 15 wherein said breast cutting means is movable from a lowered non-operative position out of the path of the breast of each carcass moving along said internal guide rail upwardly to an operative cutting position in the path of the breast of each carcass moving along said internal guide rail for engaging and segmenting the breast of a carcass moving along said internal guide rail.

20. A method of on-line processing of previously eviscerated poultry carcasses comprising the steps of;

moving a plurality of poultry carcasses in series on an overhead conveying system with each carcass suspended invertedly by its legs;

guiding the visceral cavity of each carcass onto an internal guide rail as each carcass is suspended from and moves with the conveying system so that each carcass rides along the guide rail;

cutting the breast of each carcass as each carcass is suspended from and moves with the conveying system and as each carcass rides on the internal guide rail;

separating the breast and upper back from the legs, thighs and lower back of the carcass as each carcass rides along the internal guide rail;

passing the carcass along a guide slot formed between a pair of guide members;

grasping a notch between adjacent vertebrae of the backbone of the carcass with the opposing guide members at the guide slot; and maintaining the carcass by its backbone in sliding relationship with the guide members as the carcass passes along the guide slot prior to separating the breast and upper back from the legs, thighs and lower back of the carcass.

21. The method of claim 20 and further including the step of carrying the breast and upper back of the carcass along a path diverging away from the path of movements of the legs, thighs and lower back of the carcass after separating the breast and upper back from the legs, thighs and lower back of the carcass.

* * * * *